April 12, 1966   C. N. FANGMAN   3,245,705
ROD AND PISTON CONNECTION
Filed Oct. 1, 1962   2 Sheets-Sheet 1
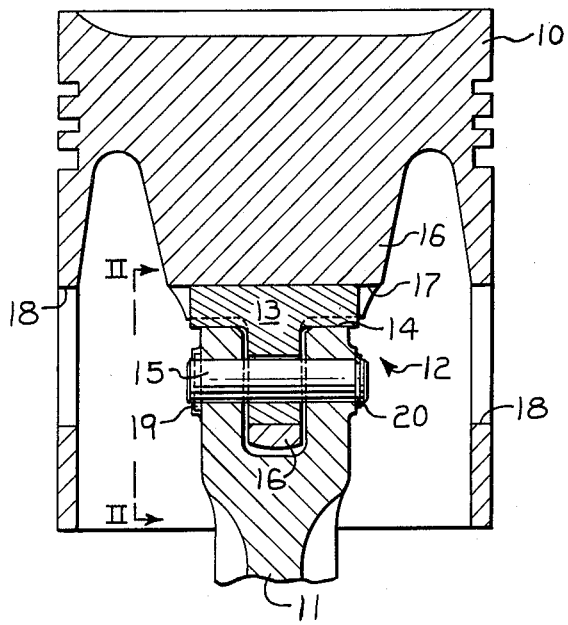
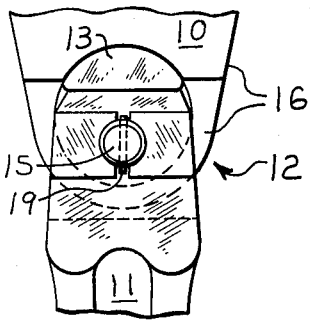
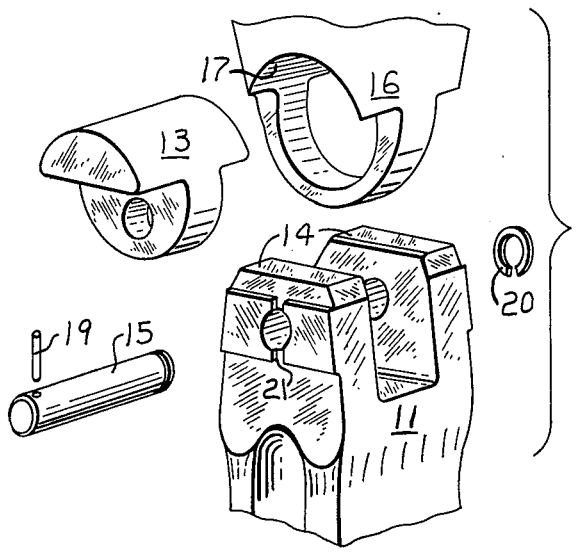
INVENTOR.
CHARLES N. FANGMAN
BY
ATTORNEYS April 12, 1966 C. N. FANGMAN 3,245,705
ROD AND PISTON CONNECTION
Filed Oct. 1, 1962 2 Sheets-Sheet 2
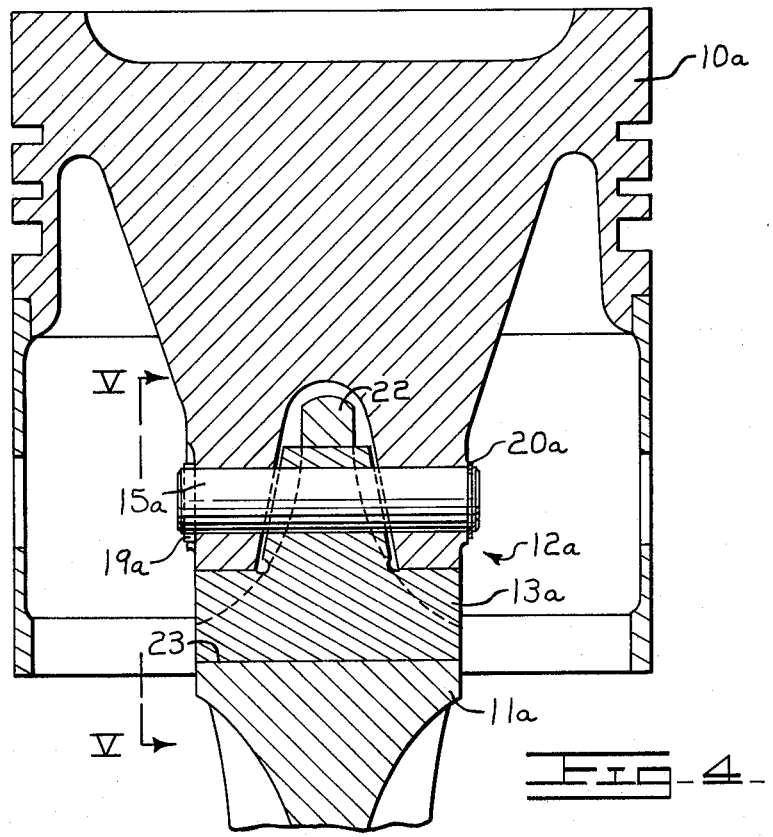
FIG-4-
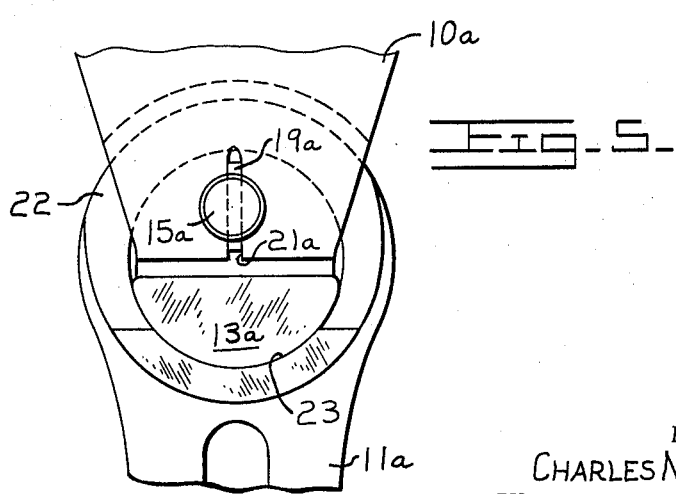
FIG-5-
INVENTOR.
CHARLES N. FANGMAN
BY
ATTORNEYS

United States Patent Office 3,245,705
Patented Apr. 12, 1966

3,245,705
ROD AND PISTON CONNECTION
Charles N. Fangman, Peoria, Ill., assignor to Caterpillar Tractor Co., Peoria, Ill., a corporation of California
Filed Oct. 1, 1962, Ser. No. 227,342
5 Claims. (Cl. 287—20)

This invention relates to a rod and piston connection and more particularly relates to a connection arranged between the connecting rod and piston of an internal combusion engine to withstand extreme actuating forces.

The trend to increase the horsepower of modern-day engines has presented the problem of providing a connection between the connecting rod and piston which will withstand the extreme actuating forces to which it may become subjected and also compensate for increased inertia loading. Typical solutions comprise the employment of a relatively light weight material for the pistons and/or the utilization of heavy duty wrist pins and the like for such connections. These and other attempts have not fully solved the problem of reducing inertia loads while at the same time affording a fail-proof connection between the connecting rod and piston.

This invention has substantially overcome the above-mentioned difficulties by providing a connection whereby a piston is constructed and arranged to impart extreme actuating forces onto a connecting rod through a uniquely arranged intermediate journal or wrist pin member. With this virtually fail-proof connecting arrangement the piston, wrist pin and other interrelated elements may be reduced in weight to thus alleviate inertia loading problems.

In accordance with the above discussions, an object of this invention is to provide a relatively simplified connection between a connecting rod and piston which will withstand extreme actuating forces.

Another object of this invention is to provide a rod and piston connection which enables a lighter piston assembly to substantially reduce inertia loading.

A still further object of this invention is to provide a rod and piston connection which may be expeditiously assembled and disassembled and affords increased sealing capabilities over conventional piston assembly arrangements.

Other and more specific objects of this invention will become apparent from the following description taken in connection with the drawings wherein:

FIG. 1 is a cross-sectional view disclosing a connecting rod and piston connection embodiment of this invention;

FIG. 2 is a fragmentary elevational view taken in the direction of arrows II—II in FIG. 1;

FIG. 3 is a perspective view disclosing the parts of FIG. 1 as they would appear in disassembled relationship;

FIG. 4 is a cross-sectional view similar to FIG. 1, disclosing a further embodiment of this invention; and FIG. 5 is a fragmentary elevational view taken in the direction of arrows V—V in FIG. 4.

FIG. 1 discloses a piston 10 connected to a piston rod 11 by means of a connection 12. The piston 10 is adapted to receive actuating forces from a combustion chamber in the conventional manner and impart such forces to an engine crankshaft (not shown) through the connecting rod. A first embodiment illustrating this invention comprises a uniquely constructed and arranged preferably T-shaped journal or wrist pin 13 which is adapted to transmit such actuating forces to upper surface portion 14 of the connecting rod. The member comprising flared and stem portions is attached to the rod by means of a retaining pin 15.

As best shown in FIG. 3, a central boss 16 extends downwardly from the head of the piston. A bore 17 extends through the boss to provide a bearing for a wrist pin. The piston skirt is apertured at 18 (FIG. 1) to facilitate assembly. The lower portions of both the boss 16 and wrist pin 13 are constructed of reduced width in order to be received within the bifurcated end of the connecting rod 11. With this construction and arrangement, the greater loads imparted through the head of the piston are initially reacted by the larger upper bearing surfaces formed by bore 17 and the wrist pin. Such loads are thereafter transmitted to the rod through the shoulders formed by the narrow part of the wrist pin and the top surfaces 14 of the bifurcated rod end.

The pin 15 extends through axially aligned apertures formed in the bifurcated end of the connecting rod and the reduced section of the wrist pin. A securing means in the form of a pin 19 and snap ring 20 and the retaining pin may be used to secure the wrist pin in the assembly in a conventional manner. A slot 21 may be formed on the connecting rod, as more clearly shown in FIG. 3, in order to prevent relative rotational movements of the pin.

The narrow or reduced portion of the boss 16 extends upwardly sufficiently (FIG. 2) to permit the necessary relative movement of the piston with respect to the rod. The retaining pin 15 is preferably loosely fitted through the bore of the wrist pin to prevent the transmission of shearing forces thereto. Also, this pin arrangement insures that the greater loads which occur during the power stroke of the piston are transmitted through the large bearing surfaces and surfaces in abutment between the wrist pin and connecting rod.

FIGS. 4 and 5 disclose a second embodiment of this invention. Like numerals with subscripts "a" are used for the elements of this embodiment which correspond to the elements of the FIGS. 1–3 embodiment. The rod and piston connection illustrated therein is particularly adapted for applications wherein heat transfer problems are created in connection with the use of a steel rather than an aluminum piston.

This embodiment comprises a piston 10a connected to a piston rod 11a at a bifurcated portion thereof by a connection 12a. A strap portion 22 of the piston rod is arranged to provide a bore 23 which forms a bearing for a wrist pin 13a comprising flared and stem portions. A pin 15a arrangement is utilized for securing purposes in much the same manner as described above. The surface portions of the journal member which are arranged in abutting relationship with surface portions formed on the bifurcated portion of the piston are effective to transmit forces from the piston to the rod in much the same manner as described in connection with the embodiment of FIGS. 1–3.

Since the wrist pin is not directly connected to the piston skirt in the above illustrated embodiments, the connections are of reduced weight, the piston assemblies may be expeditiously assembled and disassembled and enhanced sealing capabilities are promoted over conventional piston assembly arrangements. This latter desired function is afforded due to the fact that wrist pin retaining bosses, employed in many conventional piston arrangements, are normally prone to warpage which affects the piston ring sealing function. It can be particularly seen that the above described constructions and arrangements provide piston assemblies of reduced weight to thus greatly relieve the intertia problems which are normally encountered with conventional assemblies.

I claim:
1. A rod and piston connection comprising a piston having a central boss extending inwardly of its head, a bearing bore formed in said boss, a wrist pin journaled in said bore, a piston rod having a bifurcated end, said wrist pin and boss having narrow portions arranged within said bifurcated end and wider portions overlying said end, the wider portion of the wrist pin being disposed in abutment with the rod end, and means for retaining the wrist pin in its assembled relationship with respect to the rod.

2. Means operatively connecting a rod and a piston, said rod having a bifurcated end terminating in end surface portions arranged in juxtaposed relationship to surface portions formed on said piston, said piston having a boss arranged for limited rotation in the bifurcated end portion of said rod, said means comprising a member arranged in a bore formed in said piston, means mounting a first portion of said member in the bifurcated end of said rod, said member further comprising a second portion having curved surface portions arranged in bearing relationship to curved surface portions formed on said piston to permit limited rotation therebetween and further arranged to abut the end surface portions of said rod.

3. A combination comprising a piston having a boss formed thereon, said boss having a circular bore formed therethrough forming first internal surface portions of greater area than second internal surface portions formed on said boss, a journal member arranged in said bore comprising an enlarged portion providing first surface portions arranged in bearing relationship with said first internal surface portions, and a smaller portion providing second surface portions of lesser area than said first surface portions arranged in bearing relationship with said second internal surface portions, a connecting rod having a bifurcated end portion arranged to substantially enclose the smaller portion of said journal member and terminating in end surface portions which abut the enlarged portion thereof, and means mounting the smaller portion of said journal member in the bifurcated end of said rod.

4. A combination comprising a rod having a strap portion arranged for limited rotation on a journal member, said journal member comprising flared and stem portions arranged in a bore formed in said strap portion, and means mounting a bifurcated portion of a piston on said journal member, the flared portion of said journal member having surface portions arranged in abutting relationship with surface portions formed on the bifurcated portion of said piston whereby forces may be efficiently transmitted from said piston to said rod.

5. A rod and piston connection comprising a piston having a central boss extending inwardly of its head, a T-shaped wrist pin comprising flared and stem portions and having the flared portion thereof arranged in abutting relation to the central boss of said piston and said rod and a connecting pin arranged to extend through the central boss of said piston, said rod and the stem portion of said wrist pin, said connecting pin being loosely arranged in the central boss of said piston and the stem portion of said wrist pin.

References Cited by the Examiner
UNITED STATES PATENTS

| | | | |
|---|---|---|---|
| 272,662 | 2/1883 | Davis | 309—19 |
| 913,785 | 3/1909 | Van Auken | 309—19 |
| 1,281,196 | 10/1918 | Norrbom | 309—17 |
| 1,527,598 | 2/1925 | Magann | 309—19 |
| 1,959,279 | 5/1934 | Stearns | 309—19 |
| 2,040,032 | 5/1936 | Steele | 287—20 |
| 2,591,933 | 4/1952 | Harris et al. | 309—19 |
| 2,731,314 | 1/1956 | Doeg | 309—19 |

FOREIGN PATENTS

| | | |
|---|---|---|
| 530,250 | 7/1931 | Germany. |
| 330,891 | 6/1930 | Great Britain. |

OTHER REFERENCES

A.P.C. Application of Neugebauer, Serial No. 418,664, published May 25, 1943.

CARL W. TOMLIN, *Primary Examiner*.

RICHARD B. WILKINSON, *Examiner*.